United States Patent [19]

Ikenaga et al.

[11] Patent Number: 4,717,624

[45] Date of Patent: Jan. 5, 1988

[54] METHOD OF MANUFACTURING A MOLDED ARTICLE HAVING GOOD DIMENSIONAL STABILITY

[75] Inventors: Yukio Ikenaga; Katsuhiko Takahashi, both of Fuji; Tsuneyoshi Okada, Kawasaki; Kenji Hijikata; Toshio Kanoe, both of Fuji, all of Japan

[73] Assignee: Hoechst Celanese Corporation, Somerville, N.J.

[21] Appl. No.: 801,101

[22] Filed: Nov. 22, 1985

[30] Foreign Application Priority Data

Nov. 28, 1984 [JP] Japan ................. 59-251292

[51] Int. Cl.⁴ ............................................ B29C 65/66
[52] U.S. Cl. ............................ 428/423.1; 156/244.11;
156/244.23; 156/244.24; 156/244.27;
428/423.7; 428/425.8; 428/457; 428/458;
428/480; 428/515; 528/190
[58] Field of Search ................ 156/244.11, 244.23,
156/244.24, 244.14, 242, 244.27; 428/423.1,
423.7, 425.8, 480, 1, 457, 458; 528/190

[56] References Cited

U.S. PATENT DOCUMENTS

| | | | |
|---|---|---|---|
| 3,925,591 | 12/1975 | Breitenfellner et al. | 156/244.27 |
| 4,053,341 | 10/1977 | Kleiner et al. | 156/244.24 |
| 4,384,016 | 5/1983 | Ide et al. | 428/1 |
| 4,472,227 | 9/1984 | Toyoda et al. | 156/244.24 |
| 4,522,974 | 6/1985 | Calundann et al. | 528/190 |

FOREIGN PATENT DOCUMENTS 52-109578  9/1977  Japan .

*Primary Examiner*—Caleb Weston
*Attorney, Agent, or Firm*—Burns, Doane, Swecker & Mathis

[57] ABSTRACT

A laminated sheet comprises a first layer of a melt-phase anisotropy exhibiting thermoplastic polymer, having a negative linear expansion coefficient in the direction of the polymer flow and a second layer having a positive linear expansion coefficient in the direction of the polymer flow, both layers having been laminated one on another in the alternative way, further each layer having a thickness such that the negative linear expansion coefficient of said first layer and the positive linear expansion coefficient of the second layer having been offset against each other.

29 Claims, No Drawings

METHOD OF MANUFACTURING A MOLDED ARTICLE HAVING GOOD DIMENSIONAL STABILITY

The present invention relates to a method of manufacturing a molded article having good dimensional stability. More specifically, the invention relates to a method of manufacturing such molded article from an anisotropic melt phase forming polymer, wherein layers formed of such polymer so that their linear expansion coefficient is of a negative value for the direction of the polymer flow in the layer are prepared in accordance with the predetermined molding conditions at the stage of molding and wherein such layers are used in the manufacture of the molded article to allow the article to have good dimensional stability.

STATEMENT OF PRIOR ARTS

Molded articles which are manufactured from conventional thermoplastic resins by injection molding or extrusion have considerably high coefficient of linear expansion, which is usually of the order of $10^{-5}$ cm/cm/°C. In order to provide improved precision of moldings, it is desired to lower the linear expansion coefficient. Therefore, attempts have been made to lower such coefficient and thus improve the precision by controlling the orientation of polymeric chains or by compositing with fibers having a linear expansion coefficient of the order of $10^{-6}$. However, these attempts have a drawback that instable factors are involved in obtaining any improved precision and that complicated steps are required.

SUMMARY OF THE INVENTION

While conducting experiments on the molding possibilities of thermoplastic polymers capable of exhibiting the so-called melt phase anisotropy, the present inventors took notice of the fact that if such polymer is oriented highly in connection with the manufacture of a molding thereof, the molding has a negative coefficient of linear expansion in the direction of the polymer flow. Thus, the inventors found that by preparing layers formed so that the layers each had a negative coefficient of linear expansion and compositing them with other layers having a positive coefficient of linear expansion, such as formed layers of a thermoplastic polymer, metallic films, or formed sheets or coating-cured layers of a thermosetting resin. It was possible to obtain a composite layer having good dimensional stability, with a lower linear expansion coefficient of the order of $10^{-6}$ as compared with the conventional level which was of the order of $10^{-5}$.

Accordingly, the present invention provides a method of manufacturing a molded article having a good dimensional stability, characterized in that a first layer or layers each consisting of a sheet formed of a melt-phase anisotropy exhibiting thermoplastic polymer so that the sheet has a linear expansion coefficient of a negative value in the direction of the polymer flow therein, and a second layer or layers having a linear expansion coefficient of a positive value, are laminated one over another in alternate way into a composite sheet, and in that said first and second layers are controlled in thickness so that the negative linear expansion coefficient value of said first layer or layers and the positive linear expansion coefficient value of said second layer or layers are offset against each other.

The invention provides a laminated sheet which comprises a first layer of a melt-phase anisotropy exhibiting thermoplastic polymer, having a negative linear expansion coefficient in the direction of the polymer flow and a second layer having a positive linear expansion coefficient in the direction of the polymer flow, both layers having been laminated one on another in the alternative way, further each layer having a thickness such that the negative linear expansion coefficient of said first layer and the positive linear expansion coefficient of the second layer having been offset against each other.

An anisotropic melt-phase exhibiting polymer which may be used for the formation of a first layer of the composite sheet in accordance with the invention can easily be formed into a molded sheet having a negative linear expansion coefficient in the direction of the polymer flow therein, if the polymer is highly oriented in the direction of its flow at the stage of extrusion or injection molding. The orientation of such polymer can be accomplished by subjecting the molded sheet to drawing, and the negative value for the linear expansion coefficient in the main axial direction can be readily controlled by adjusting the draw ratio. In practicing the present invention, any such anisotropic melt phase forming polyester as will be described hereinafter is extruded and drawn into an oriented sheet. In this connection, it is desirable that the draw-down ratio should be controlled in order to obtain a sheet having the desired linear expansion coefficient of a negative value.

For a second layer having a positive linear expansion coefficient that is to be laminated with the first layer comprising such molded sheet having a negative linear expansion coefficient, any of the following may be used: a non-oriented sheet formed by extruding or compression-molding same anisotropic melt-phase forming thermoplastic polymer as used for the formation of the first layer; a sheet molded of a thermoplastic resin having a positive linear expansion coefficient; a metallic sheet; and a molded sheet or coated and cured layer of a thermostetting resin.

According to the invention, the aforesaid first and second layers are laminated one over another in alternate pattern into a composite sheet. For this purpose, it is desirable that the first and second layers should be laminated in three or a higher odd number of layers. For example, if a composite sheet having three layers is to be produced, one second layer may be sandwiched between two first layers. Conversely, one first layer may be sandwiched between two second layers. In the case of five layers, three first layers and two second layers may be laminated together so that the both surfaces of the composite sheet are represented by first layers. Conversely, it is also possible that the both surfaces are represented by second layers. In this case, the composite sheet must have an odd number of layers, or otherwise a proper balance can not be obtained in the thicknesswise direction of the composite sheet and some warpage may develop with the sheet. However, where six or more layers are used, it is not particularly necessary to insist on an odd number of layers.

In the present invention, it is essential that in connection with the above said lamination work the first and second layers should be regulated in thickness so that the negative value for the linear expansion coefficient of the first layer(s) and the positive value for the linear expansion coefficient of the second layer(s) are offset against each other. It is desirable that such thickness control should be effected so that the linear expansion coefficient of the composite sheet will be of the order of $10^{-6}$.

For lamination purposes, it is a most common practice that a first layer or layers of a molded sheet form and a second layer or layers, also of a molded sheet form, are laminated one over another and the sheets so laminated are hot pressed. If the second layer(s) is of a thermosetting resin, uncured resin may be coated on the first layer molded sheet and cured to form a cured layer. If the second layer(s) is of a metallic material, a thermosetting resin adhesive, such as epoxy resin, may be applied to both the first layer molded sheet and the metallic sheet so that they are bonded together by resin curing.

Anisotropic melt phase forming polymers which are used in the manufacture of molded articles having good dimensional stability in accordance with the invention are thermoplastic malt processable polymer compounds which will exhibit an optical anisotropy when they are in molten state, and they are generally classified as liquid-crystalline thermotropic polymers.

Such anisotropic melt-phase forming polymers have a tendency that the molecular chains of the polymer have a regular parallel arrangement. The state of such molecular arrangement is often called "liquid crystal state" or "nematic phase of liquid crystalline substance". Generally, such polymer is produced from a monomer having a plurality of extended chain links which are elongate, considerably rigid, and are usually in coaxial or parallel relation.

The nature of melt-phase anisotropy can be ascertained by conventional polarimetric techniques utilizing cross polarizers. More specifically, melt phase anisotropy can be confirmed by employing a Leitz polarization microscope to observe a test specimen placed on a Leitz hot stage under nitrogen atmosphere and at 40× magnification. That is, light is allowed to permeate through the specimen when it is examine between the cross polarizers. If the specimen is optically anisotropic, polarized light will permeate therethrough, even if the specimen is in static condition.

Components of aforesaid anisotropic melt phase forming polymers are listed below.

① Component consisting of one or more of aromatic dicarboxylic acids and alicyclic dicarboxylic acids;
② Component consisting of one or more of aromatic diols, alicyclic diols, and aliphatic diols;
③ Component consisting of one or more of aromatic hydroxy-carboxylic acids;
④ Component consisting of one or more of aromatic thiol carboxylic acids;
⑤ Component consisting of one or more of aromatic dithiols, and aromatic thiol phenols; and
⑥ Component consisting of one or more of aromatic hydroxyamines and aromatic diamines.

Anisotropic melt-phase forming polymers are composed of the following combinations:

(I) Polyester composed of ① and ② above;
(II) Polyester composed of ③ only;
(III) Polyester composed of ①, ②, and ③;
(IV) Polythiolester composed of ④ only;
(V) Polythiolester composed of ① and ⑤;
(VI) Polythiolester composed of ①, ④ and ⑤;
(VII) Polyester amide composed of ①, ③ and ⑥; and
(VIII) Polyester amide composed of ①, ②, ③ and ⑥.

Though not included in the category of the above combinations of components, aromatic polyazomethines are included among anisotropic melt-phase forming polymers. Typical examples of such polymers are poly-(nitrilo-2-methyl-1,4-phenylene nitrolethylidine-1,4-phenylene ethylidine); poly-(nitrilo-2-methyl-1,4-phenylene nitrilomethylidine-1,4-phenylene methylidine); and poly-(nitrilo-2-chloro-1,4-phenylene nitrilomethylidine-1,4-phenylene methylidine).

Though not included in the category of the above combinations of components, polyester carbonates are included among anisotropic melt-phase forming polymers. These are composed essentially of 4-oxybenzoyl unit, dioxyphenyl unit, dioxycarbonyl unit, and terephthaloyl unit.

Enumerated below are chemical compounds which may constitute the components of above said items (I)–(VIII).

Among the aromatic dicarboxylic acids are such aromatic dicarboxylic acids as terephthalic acid, 4,4'-diphenyl dicarboxylic acid, 4,4'-triphenyl dicarboxylic acid, 2,6-naphthalene dicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenylether-3,3'-dicarboxylic acid, diphenoxyethane-3,3'-dicarboxylic acid, diphenylethane-3,3'-dicarboxylic acid, and naphthalene-1,6-dicarboxylic acid; or the alkyl-, alkoxy-, or halogen-substituted of the above enumerated aromatic dicarboxylic acids, such as chloroterephthalic acid, dichloroterephthalic acid, bromoterephthalic acid, methyl terephthalic acid, dimethyl terephthalic acid, ethyl terephthalic acid, methoxy terephthalic acid, and ethoxy terephthalic acid.

Among the alicyclic dicarboxylic acids are such alicyclic dicarboxylic acids as trans-1,4-cyclohexane dicarboxylic acid, cis-1,4-cyclohexane dicarboxylic acid, and 1,3-cyclohexane dicarboxylic acid; or the alkyl-, alkoxy-, or halogen-substituted of the above enumerated alicyclic dicarboxylic acids, such as trans-1,4-(1-methyl) cyclohexane dicarboxylic acid, and trans-1,4-(1-chlor) cyclohexane dicarboxylic acid.

Among the aromatic diols are such aromatic diols as hydroquinone, resorcinol, 4,4'-dihydroxy diphenyl, 4,4'-dihydroxy-triphenyl, 2,6-naphthalene diol, 4,4'-dihydroxy diphenyl ether, bis(4-hydroxyphenoxy) ethane, 3,3'-dihydroxy diphenyl, 3,3'-dihydroxy diphenyl ether, 1,6-naphthalene diol, 2,2-bis(4-hydroxyphenyl) propane, and 2,2-bis(4-hydroxyphenyl) methane; or the alkyl-, alkoxy-, or halogen-substituted of the above enumerated aromatic diols, such as chlorohydroquinone, methyl hydroquinone, 1-butylhydroquinone, phenyl hydroquinone, phenyl hydroquinone, methoxy hydroquinone, phenoxy hydroquinone, 4-chloro resorcinol, and 4-methyl resorcinol.

Among the alicyclic diols are such alicyclic diols as trans-1,4-cyclohexane diol, cis-1,4-cyclohexane diol, trans-1,4-cyclohexane dimethanol, cis-1,4-cyclohexane dimethanol, trans-1,3-cyclohexane diol, cis-1,2-cyclohexane diol, and trans-1,3-cyclohexane dimethanol; or the alkyl-, alkoxy-, or halogen-substituted of the above enumerated alicyclic diols, such as trans-1,4-(1-methyl) cyclohexane diol, and trans-1,4-(1-chloro) cyclohexane diol.

Among the aliphatic diols are such straight-chain or branched aliphatic diols as ethylene glycol, 1,3-propane diol, 1,4-butane diol, and neopentyl glycol.

Among the aromatic hydroxy carboxylic acids are such aromatic dihydroxy carboxylic acids as 4-hydroxy benzoic acid, 3-hydroxy benzoic acid, 6-hydroxy-2-naphthoic acid, and 6-hydroxy-1-naphthoic acid; or the alkyl-, alkoxy, or halogen-substituted of aromatic hydroxy carboxylic acids, such as 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, 6-hydroxy-5-methyl-2-naphthoic acid, 6-hydroxy-5-methoxy-2-naphthoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 6-hydroxy-5-chloro-2-naphthoic acid, 6-hydroxy-7-chloro-2-naphthoic acid, and 6-hydroxy-5,7-dichloro-2-naphthoic acid.

Among the aromatic mercapto carboxylic acids are 4-mercaptobenzoic acid, 3-mercaptobenzoic acid, 6-mercapto-2-naphthoic acid, and 7-mercapto-2-naphthoic acid.

Among the aromatic diols are benzene-1,4-dithiol, benzene-1,3-dithiol, 2,6-naphthalene-dithiol, and 2,7-naphthalene-dithiol.

Among the mercaptophenols are 4-mercaptophenol, 3-mercaptophenol, 6-mercaptophenol, and 7-mercaptophenol.

Among the aromatic hydroxyamines and aromatic diamines are 4-aminophenol, N-methyl-4-aminophenol, 1,4-phenylene diamine, N-methyl-1,4-phenylene diamine, N,N'-dimethyl-1,4-phenylene diamine, 3-aminophenol, 3-methyl-4-aminophenol, 2-chloro-4-aminophenol, 4-amino-1-naphthol, 4-amino-4'-hydroxy diphenyl, 4-amino-4'-hydroxydiphenyl ether, 4-amino-4'-hydroxydiphenyl methane, 4-amino-4'-hydroxydiphenyl sulfide, 4,4'-diamino-phenyl sulfide (thiodianiline), 4,4'-diaminophenyl sulfone, 2,5-diaminotoluene, 4,4'-ethylene dianiline, 4,4'-diaminophenoxy ethane, 4,4'-diaminophenol methane (methylene dianiline), and 4,4'-diaminodiphenyl ether (oxydianiline).

Among aforesaid polymer groups (I)–(VIII) composed of ingredients selected from among the above numerated compounds may be some which are not capable of exhibiting anisotropic melt phase forming characterisitics, depending upon the types of the components, their proportions in the polymer, and their sequential distribution. It is noted that polymers used for the purpose of the invention are limited to those of the above enumerated which exhibit melt-phase anisotropy.

Polyesters referred to in Items (I), (II) and (III) above, and polyester amides referred to in item (VIII) above, which all are anisotropic melt-phase forming polymers suitable for the purpose of the invention, can be produced by employing various different esterification techniques wherein organic monomer compounds having functional groups capable of forming the required repeating units are caused to react with each other through condensation. For example, functional groups in these organic monomer compounds may be carboxyl, hydroxyl, ester, acyloxy groups, acid halide, or amine groups. Said organic monomers may be caused to reach with one another by a melt acidolysis method and without the presence of heat exchange fluid. In such method, the monomers are first melted together to form a melt solution of reactants. As reaction progresses, solid polymer particles are suspended in the solution. In order to facilitate the removal of any volatile matter (e.g. acetic acid or water) produced as a by-product at the final stage of condensation, vacuum may be applied.

The slurry polymerization techniques may be employed as well in the preparation of complete aromatic polyesters suitable for the purpose of the invention. Where this method is employed, solid products are obtained as suspended in the heat exchange medium.

Whichever may be employed of the acidolysis or slurry polymerization method, the organic monomer reactants for deriving a complete aromatic polyester may be used for reaction purposes in a modified form such that the hydroxyl groups of such monomers at ordinary temperatures are esterified (that is, as a lower acylester). Lower acyl groups are desirably those having about 2–4 carbon atoms. Preferably, ester acetates of the organic monomer reactants are subjected to reaction.

Typical examples of catalysts that may be arbitrarily used in either method, acidolysis or slurry polymerization, are dialkyl tin oxide (e.g. dibutyltin oxide), diaryltin oxide, titanium dioxide, antimony trioxide, alkoxy titanium silicate, titanium alkoxide, alkali and alkali earth metal salts of carboxylic acid (e.g. zinc acetate), Lewis acids (e.g. $BF_3$), and hydrogen halide (e.g. HCl). The amount of catalysts to be used is generally about 0.001–1% by weight, and more specifically 0.01–0.2% by weight relative to the total weight of monomers.

Completely aromatic polymers preferred for the purpose of the invention are apt to be substantially insoluble in solvents in general, and are therefore unsuitable for solution processing. As already stated, however, these polymers can easily be processed by conventional melt processing techniques. Particularly preferred complete aromatic polymers are soluble in pentafluorophenol to some extent.

Completely aromatic polyesters preferred for the purpose of the invention generally have a weight-average molecular weight of about 2,000–200,000, and preferably about 10,000–50,000. Most preferably, they have a weight-average molecular weight of about 20,000–25,000. Preferred complete aromatic polyester amides generally have a molecular weight of about 5,000–50,000, and preferably about 10,000–30,000, e.g. 15,000–17,000. Such molecular weight can be measured by gel permeation chromatography and other standard measurement techniques which do not involve formation of polymer solution, or for example, through quantitative determination by infrared spectrophotometry of terminal groups in a compression-molded film. It is also possible to measure such molecular weight with a pentafluorophenolic solution of the polymer by employing a light scattering method.

Aforesaid complete aromatic polyesters and polyester amides generally show a logarithmic viscosity number (I.V.) of about 2.0 dl/g at least, for example, about 2.0–10.0 dl/g, when they are dissolved in pentafluorophenol at a concentration of 0.1 wt % and at 60° C.

Anisotropic melt phase forming polyesters preferred specifically for the purpose of the invention contain more than 10 mol % of repeating units which contain naphthalene parts, such as 6-hydroxy-2-naphthoyl, 2,6-dihydroxynaphthalene, and 2,6-dicarboxy-naphthalene. Preferred polyester amides contain repeating units including said naphthalene parts and 4-aminophenol or 1,4-phenylenediamine parts. More specifically, such polyesters and polyester amides are as described below.

(1) A polyester composed essentially of the following repeating units I and II.

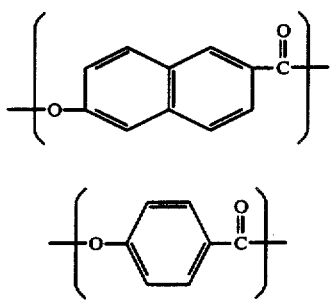

This polyester contains about 10–90 mol % of unit I and about 10–90 mol % of unit II. In one form, unit I is present in a molarity of about 65–85 mol %, and preferably of about 70–80 mol % (e.g. about 75 mol %). In another form, unit II is present in a far much lower molarity of 15–35 mol %, and preferably of about 20–30 mol %. In some case, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them.

(2) A polyester composed essentially of the following repeating units I, II and III:

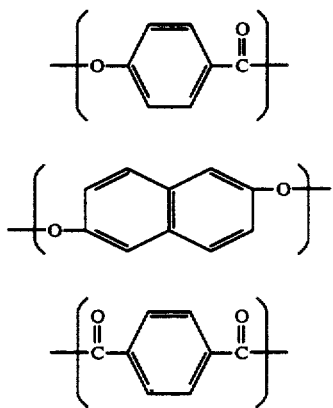

This polyester contains about 30–70 mol % of unit I. Preferably, the polyester contains about 40–60 mol % of unit I, about 20–30 mol % of unit II, and about 20–30 mol % of unit III. In some case, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them.

(3) A polyester composed essentially of the following repeating units I, II, III and IV:

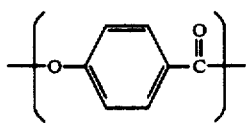

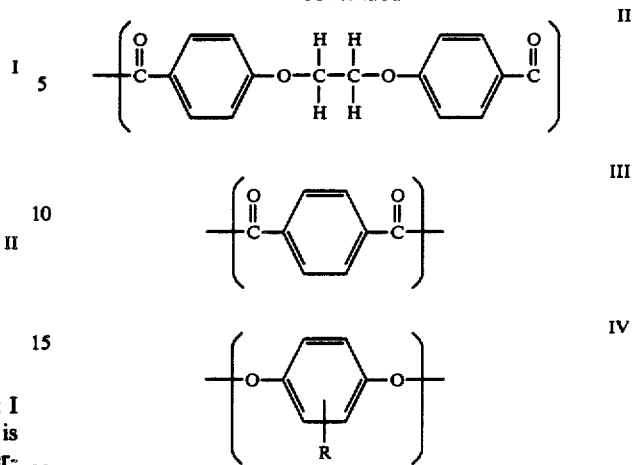

(where R represents methyl, chloro, bromo or a combination of them, being a substituent group for hydrogen atoms on an aromatic ring.) This polyester contains about 20–60 mol % of unit I, about 5–18 mol % of unit II, about 5–35 mol % of unit III, and about 20–40 mol % of unit IV. Preferably, this polyester contains about 35–45 mol % of unit I, about 10–15 mol % of unit II, about 15–25 mol % of unit III, and about 25–35 mol % of unit IV. Provided that the total molarity of units II and III is substantially equal to the molarity of unit IV. In some cases, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them. This completely aromatic polyester generally shows a logarithmic viscosity number of at least 2.0 dl/g, e.g. 2.0–10.0 dl/g, when it is dissolved at a concentration of 0.3 w/v % in pentafluorophenol at 60° C.

(4) A polyester composed essentially of the following repeating units I, II, III and IV:

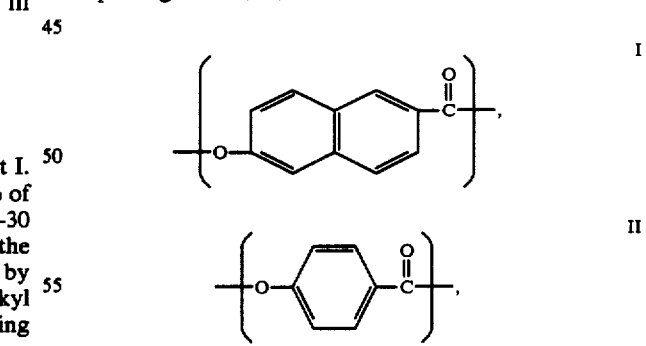

III  a dioxyaryl unit expressed by general formula $-\!\!+\!\!O\!\!-\!\!Ar\!\!-\!\!O\!\!+\!\!-$ (where Ar represents a bivalent group including at least one aromatic ring);

IV  a dicarboxyaryl unit expressed by general formula

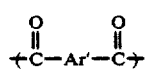

(where Ar' represents a bivalent group including at least one aromatic ring).

This polyester contains about 20–40 mol % of unit I, more than 10 mol % but not more than 50 mol % of unit II, more than 5 mol % but not more than 30 mol % of unit III, and more than 5 mol % but not more than 30 mol % of unit IV. Preferably, the polyester contains about 20–30 mol % (e.g. about 25 mol %) of unit I, about 25–40 mol % (e.g. about 35 mol %) of unit II, about 15–25 mol % (e.g. about 20 mol %) of unit III, and about 15–25 mol % (e.g. about 20 mol %) of unit IV. In some cases, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them.

Units III and IV are preferably symmetrical in the sense that bivalent bonds connecting these units to other units on both sides in the main polymeric chain are symmetrically positioned on one or two aromatic rings (for example, if present on a naphthalene ring or rings, they are positioned in para relation or on diagonally opposite rings). It is noted, however, that such asymmetric units as are derived from resorcinol and isophthalic acid may be used as well.

A preferred form of dioxyaryl unit III is:

and a preferred form of dicarboxyaryl unit IV is:

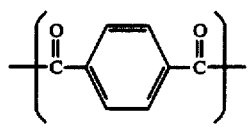

(5) A polyester composed essentially of the following repeating units I, II and III:

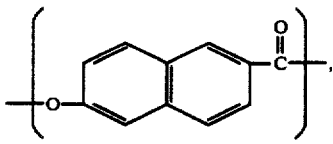

II a dioxyaryl unit expressed by general formula ─{O—Ar—O}─ (where Ar represents a bivalent group including at least one aromatic ring);

III a dicarboxyaryl unit expressed by general formula

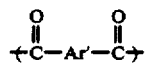

(where Ar' represents a bivalent group including at least one aromatic ring).

This polyester contains about 10–90 mol % of unit I, 5–45 mol % of unit II, and 5–45 mol % of unit III. Preferably, the polyester contains about 20–80 mol % of unit I, about 10–40 mol % of unit II, and about 10–40 mol % of unit III. More preferably, this polyester contains about 60–80 mol % of unit I, about 10–20 mol % of unit II, and about 10–20 mol % of unit III. In some case, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them.

A preferred form of dioxyaryl unit II is:

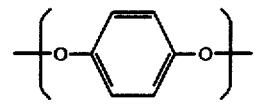

and a preferred form of dicarboxyaryl unit III is:

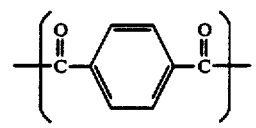

(6) A polyester amide composed essentially of the following repeating units I, II, III and IV:

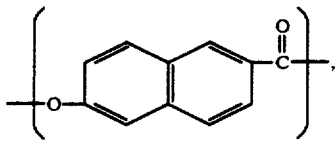

II general formula

(where A represents a bivalent group including at least one aromatic ring, or a bivalent trans-cyclohexane group);

III general formula ─{Y—Ar—Z}─ (where Ar represents a bivalent group including at least one aromatic ring; Y represents O, NH or NR; Z represents NH or NR, and R represents an alkyl group or aryl group having 1–6 carbon atoms);

IV general formula ─{O—Ar'—O}─ (where Ar' represents a bivalent group having at least one aromatic ring).

This polyester amide contains about 10–90 mol % of unit I, about 5–45 mol % of unit II, about 5–45 mol % of unit III, and about 0–40 mol % of unit IV. In some cases, at least a fraction of the hydrogen atoms in bond with a ring may be replaced by a substituent selected from the group consisting of alkyl groups having 1–4 carbon atoms, alkoxy groups having 1–4 carbon atoms, halogens, phenyls, substituted phenyls, and combinations of them.

A preferred form of dicarboxyaryl unit II is:

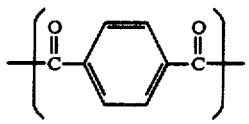

and a preferred form of unit III is:

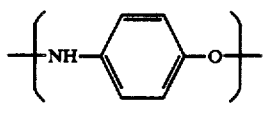

or

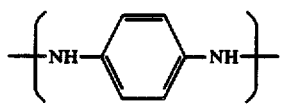

A preferred form of unit IV is:

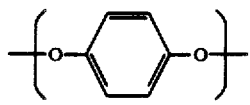

Further, the anisotropic melt phase forming polymers available for the purpose of the present invention include polymers such that a portion of one polymeric chain is composed of a segment of one of the above described anisotropic melt phase forming polymers and the remaining portion is composed of a segment of a thermoplastic resin which does not form an anisotropic melt phase.

Any anisotropic melt phase forming and melt processable polymer compound may contain one or more of the following:

(1) another anisotropic melt phase polymer, (2) a thermoplastic resin which does not form an anisotropic melt phase, (3) a thermosetting resin, (4) a low molecular weight organic compound, and (5) an inorganic material. In this case, the anisotropic melt phase forming polymer portion of the compound and the remaining portion may or may not be thermodynamically compatible with each other.

The thermoplastic resin referred to in (2) above embraces, for example, polyethylene, polypropylene, polybutylene, polybutadiene, polyisoprene, polyvinyl acetate, polyvinyl chloride, polyvinylidene chloride, polystyrene, acrylic resins, ABS resins, AS resins, BS resins, polyurethane, silicon resins, fluoroplastics, polyacetal, polycarbonate, polyethylene terephthalate, polybutylene terephthalate, aromatic polyester, polyamide, polyacrylonitrile, polyvinyl alcohol, polyvinyl ether, polyether imide, polyamide imide, polyether ether imide, polyether ether ketones, polyether sulfone, polysulfone, polyphenylene sulfide, polyphenylene oxide, and so forth.

The thermosetting resin referred to in (3) above embraces, for example, phenolic resins, epoxy resins, melamine resins, urea resins, unsaturated polyester resins, alkyd resins, etc.

The low-molecular-weight organic compound referred to in (4) above embraces those used conventionally as additives for thermoplastic and thermosetting resins, and more specifically, low-molecular-weight organic compounds used as, for example, plasticizers, light and weathering stabilizers, such as anti-oxidizing agents and ultraviolet absorbing agent, anti-static agent, flame retarding agent, colorants such as dyes and pigments, foaming agent, divinyl-based compounds, crosslinking agents such as peroxides and vulcanizing agents, and lubricants for fluidity and releasability improvement.

The inorganic material referred to in (5) above embraces those inorganics which are conventionally used as additives for thermoplastic and thermosetting resins, and more particularly, inorganic fibers, such as glass fiber, carbon fiber, metallic fiber, ceramic fiber, boron fiber, and asbestos, powdery materials, such as calcium carbonate, highly dispersible silicic acid, alumina, aluminum hydroxide, talc powder, mica, glass flake, glass beads, silica flour, quartz sand, metallic powders, carbon black, barium sulfate, and calcined gypsum, inorganic compounds, such as silicon carbide, alumina, boron nitride, and silicon nitride, and whiskers and metallic whiskers.

Anisotropic melt-phase forming polymer compounds used for the purpose of the invention are such that, when they are in melt phase, their polymeric chains are highly oriented even if the melt is in static condition. Through the flow of the melt during melt processing does the polymer tend to become oriented still more conspicuously; and by subsequent drawing it is possible to obtain a molded sheet having a negative linear expansion coefficient of the order of $-1 - -4 \times 10^{-5}$ cm/cm °C. in the main axial direction. In the case where no drawing is carried out, a molded sheet having a positive linear expansion coefficient of the order of $+0.7-5.0 \times 10^{-5}$ is normally obtained if no filler is used; and if such filler as glass fiber is incorporated, the linear expansion coefficient of the molded sheet is usually of the order of $+0.5-4.5 \times 10^{-5}$.

For thermoplastic resins having a positive linear expansion coefficient which may be used for formation of a second layer of the composite sheet in accordance of the invention, there is no particular limitation; any such resin may be used inasmuch as it can be brought in bond with a first layer molder sheet by hot pressing or coating and curing. Among such resins are, for example, polyamides such as nylons, polyolefins such as polyethylene and polypropylene, and polyesters such as PET and PBT, styrenes such as polycarbonate, polyacetal, and ABS. Generally, these thermoplastic resin materials have a linear expansion coefficient of the order of $2-15 \times 10^{-5}$ cm/cm °C.

With metallic sheets which may be used as well for the formation of a second layer of the composite sheet according to the invention, there is no particular limitation either. Various metallic materials, such as for example copper, iron, aluminum, steel, stainless steel, magnesium, and zinc, can be used. The linear expansion coefficient of those metallic materials is comparatively low, being of the order of $1-3 \times 10^{-5}$ cm/cm °C.

Among thermosetting resins which may be used as well for the formation of a second layer of the composite sheet of the invention are epoxy resins, urethane resins, phenolic resins, unsaturated polyesters, diallylphthalate resins, silicon resins, and polyimides, all of which may be suitably used.

EFFECT OF THE INVENTION

Generally, the linear expansion coefficient for thermoplastic resin moldings having good dimensional stability is of the order of $2.6 \times 10^{-5}$ in the case of moldings of polyether sulfone, and $1.6 \times 10^{-5}$ in the case of biaxially oriented PET moldings.

In contrast to this, according to the manufacturing method of the present invention it is possible to produce a molded article having exceptionally good dimensional stability such that the linear expansion coefficient of the article is within the range of $0-\pm 0.2 \times 10^{-6}$.

The composite produced in accordance with the invention is formable into round bar, square bar, and various other forms, as well as flat plate form, by employing conventional forming techniques. The molded article of the invention is ideal for those parts and components of which dimensional stability is required. For example, it can be used in various areas of application including connection parts etc. for optical wave guide in optical communication; recording substrates, substrate bodies, etc. in information recording; gear, processing robot arms, lens tubes, wiring substrates, parts and bodies thereof, precision-instrument scale plates, position detecting parts utilizing microwaves, and bodies thereof in precision and electronic machines and equipment.

EXAMPLES

The present invention will be illustrated by the following examples; however, it is to be understood that the scope of the invention is not limited by these examples.

MANUFACTURING EXAMPLE 1

(Preparation of Oriented Sheets having a Negative Linear Expansion Coefficient)

Pellets of one of several types of anisotropic melt-phase exhibiting polyesters to be hereinafter explained (A, B, C and D), previously dried at 140° C. for 7 hrs, were extruded at a velocity of 2.72 m/min by employing a T-die type extruder into a film having a width of 8.15 cm and a thickness of 0.15 m/m. The draw-down ratio in this case was 14.0.

The sheet thus obtained was tested in accordance with JIS K 6714 to measure into linear expansion coefficient in the main axial direction. The measurements were as shown in the left column of Table 1.

MANUFACTURING EXAMPLE 2

(Preparation of Non-Oriented Sheets)

Pellets of same type(s) of anisotropic melt-phase exhibiting polymer that was used in the manufacturing example 1 were hot-pressed under heating at 300° C. by employing a 50t hot press, and a 0.30 m/m thick non-oriented sheet was thus obtained.

EXAMPLES 1-18

A composite sheet was prepared by using as a first layer the anisotropic melt-phase exhibiting oriented sheet as obtained in the manufacturing example 1 and laminating same with the hot pressed, non-oriented sheet as obtained in the manufacturing example 2, or with another sheet exhibiting a positive linear expansion coefficient or an epoxy resin coat-cured layer as shown in Table 2, so that the respective layers were of such thickness as specified in Table 2. The overall linear expansion coefficient of the composite sheet was measured. The measurement results are shown in Table 2. It is noted that in Table 2, under the column of "How prepared", "Hot press" means that the relevant laminate was hot pressed by a 50t hot press under heating at 300° C. For reference, it may be noted that in order to ascertain the linear expansion coefficient of the oriented sheet (in manufacturing example 1) after hot pressed, the oriented sheet from the manufacturing example 1, placed between two polyethylene sheets, was hot-pressed under similar conditions, with the result that values as shown in the right column of Table 1 were obtained for 0.13 m/m thick sheets.

The anisotropic melt-phase forming polymers A, B, C and D, each used as a film forming resin, had the following component units.

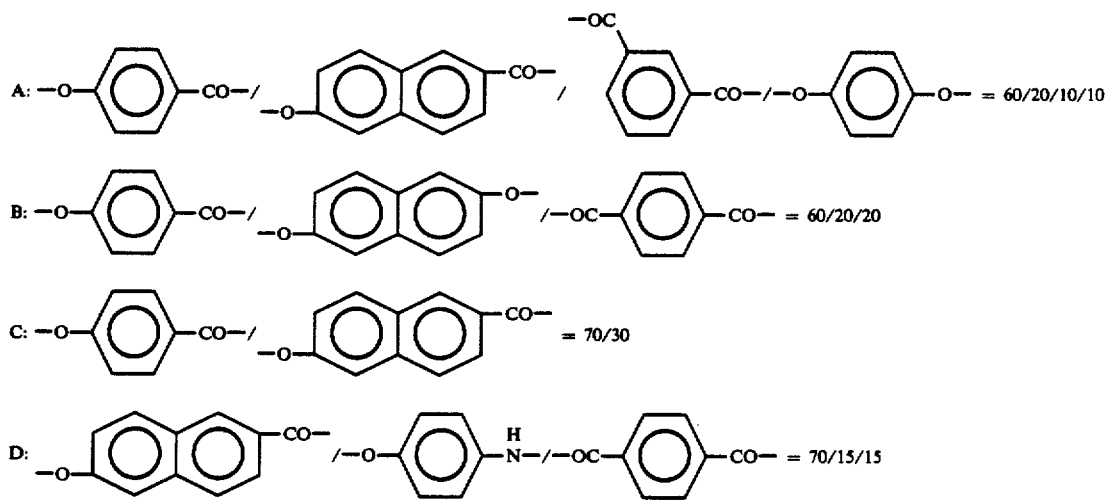

The specific procedures employed in producing aforesaid resins A, B, C and D are described below.

<Resin A>

Into a reactor having a stirrer, a nitrogen intake pipe, and a distilling pipe were charged 1081 parts by weight of 4-acetoxy benzoic acid, 460 parts by weight of 6-acetoxy-2-naphthoic acid, 166 parts by weight of isophthalic acid, and 194 parts by weight of 1,4-diacetoxybenzene, and the mixture was heated to 260° C. under nitrogen gas streams. While acetic acid was distilled away from the reactor, the content of the reactor was vigorously stirred at 260° C. for 2.5 hrs. and then at 280° C. for 3 hrs. The temperature was further raised to 320° C. and the introduction of nitrogen was stopped. Thereafter, the pressure in the reactor was gradually reduced to 0.1 mmHg in 15 min, and stirring was continued for one hour under these temperature and pressure conditions.

The polymer thus obtained had an inherent viscosity of 5.0 as measured in pentafluorophenol at a concentration of 0.1 wt % and at 60° C.

<Resin B>

Into a reactor having a stirrer, a nitrogen intake pipe, and a distilling pipe were charged 1081 parts by weight of 4-acetoxy benzoic acid, 489 parts by weight of 2,6-diacetoxy naphthalene, and 332 parts by weight of terephthalic acid, and the mixture was heated to 250° C. under nitrogen gas streams. While acetic acid was distilled away from the reactor, the content of the reactor was vigorously stirred at 250° C. for 2 hrs, and then at 280° C. for 2.5 hrs. The temperature was further raised to 320° C. and the introduction of nitrogen was stopped. Thereafter, the pressure in the reactor was gradually reduced to 0.2 mmHg in 30 min, and stirring was continued for 1.5 hrs under these temperature and pressure conditions.

The polymer thus obtained had an inherent viscosity of 2.5 as measured in pentafluorophenol at a concentration of 0.1 wt % and at 60° C.

<Resin C>

Into a reactor having a stirrer, a nitrogen intake pipe, and a distilling pipe were charged 1261 parts by weight of 4-acetoxy benzoic acid and 691 parts by weight of 6-acetoxy-2-naphthoic acid, and the mixture was heated to 250° C. under nitrogen gas streams. While acetic acid was distilled away from the reactor, the content of the reactor was vigorously stirred at 250° C. for 3 hrs, and then at 280° C. for 2 hrs. The temperature was further raised to 320° C. and the introduction of nitrogen was stopped. Thereafter, the pressure in the reactor was gradually reduced to 0.1 mmHg in 20 min, and stirring was continued for 1 hr under these temperature and pressure conditions.

The polymer thus obtained had an inherent viscosity of 5.4 as measured in pentafluorophenol at a concentration of 0.1 wt % and at 60° C.

<Resin D>

Into a reactor having a stirrer, a nitrogen intake pipe, and a distilling pipe charged 1612 parts by weight of 6-acetoxy-2-naphthoic acid, 290 parts by weight of 4-acetoxy acetanilide, 249 parts by weight of terephthalic acid, and 0.4 part by weight of sodium acetate, and the mixture was heated to 250° C. under nitrogen gas streams. While acetic acid was distilled away from the reactor, the content of the reactor was vigorously sitred at 250° C. for one hour, and then at 300° V. for 3 hrs. The temperature was further raised to 340° C. and the introduction of nitrogen was stopped. Thereafter, the pressure in the reactor was gradually reduced to 0.2 mmHg in 30 min, and stirring was continued for 30 min under these temperature and pressure conditions.

The polymer thus obtained had an inherent viscosity of 3.9 as measured in pentafluorophenol at a concentration of 0.1 wt % and at 60° C.

TABLE 1

| Linear Expansion Coefficients of Oriented Sheets | | |
|---|---|---|
| | Linear expnansion coefficient (for direction of orientation) | |
| | Before hot press | After hot press |
| A | $-2.6 \times 10^{-5}$ | $-2.3 \times 10^{-5}$ |
| B | $-2.7 \times 10^{-5}$ | $-2.3 \times 10^{-5}$ |
| C | $-2.9 \times 10^{-5}$ | $-2.5 \times 10^{-5}$ |
| D | $-3.1 \times 10^{-5}$ | $-2.7 \times 10^{-5}$ |

TABLE 2

| Expl. No. | No. of layers | Construction 1st layer | 2nd layer | 3rd layer | 4th layer | 5th layer | Resin used in oriented sheet | How prepared | Neg lin exp coef layer Lin exp coef (CTE) | Thick | Pos lin exp coef layer CTE | Thick | Overall CTE (in aniso direction) |
|---|---|---|---|---|---|---|---|---|---|---|---|---|---|
| 1 | 3 | Oriented sheet of C | Hot-pressed sheet of C | Oriented sheet of C | — | — | C | Hot press | $-2.5 \times 10^{-5}$ | 0.13 m/m (×2) | $4.5 \times 10^{-5}$ | 0.30 m/m | $0.16 \times 10^{-5}$ |
| 2 | 3 | Oriented sheet of A | Hot-pressed sheet of A | Oriented sheet of A | — | — | A | Hot press | $-2.3 \times 10^{-5}$ | 0.13 m/m (×2) | $4.9 \times 10^{-5}$ | 0.30 m/m | $0.19 \times 10^{-5}$ |
| 3 | 3 | Oriented sheet of C | Hot-pressed sheet cont. 30% gl fbr | Oriented sheet of C | — | — | C | Hot press | $-2.5 \times 10^{-5}$ | 0.13 m/m (×2) | $3.7 \times 10^{-5}$ | 0.32 m/m | $0.14 \times 10^{-5}$ |
| 4 | 3 | Oriented sheet of C | Polyamide sheet | Oriented sheet of C | — | — | C | Hot press | $-2.5 \times 10^{-5}$ | 0.13 m/m (×2) | $8.1 \times 10^{-5}$ | 0.10 m/m | $0.15 \times 10^{-5}$ |
| 5 | 3 | Oriented sheet of C | PBT sheet | Oriented sheet of C | — | — | C | Hot press | $-2.5 \times 10^{-5}$ | 0.13 m/m (×2) | $13 \times 10^{-5}$ | 0.10 m/m | $0.18 \times 10^{-5}$ |
| 6 | 3 | Oriented sheet of A | PBT sheet | Oriented sheet of A | — | — | A | Hot press | $-2.3 \times 10^{-5}$ | 0.13 m/m (×2) | $13 \times 10^{-5}$ | 0.10 m/m | $0.19 \times 10^{-5}$ |
| 7 | 3 | Oriented sheet of B | PBT sheet | Oriented sheet of B | — | — | B | Hot press | $-2.3 \times 10^{-5}$ | 0.13 m/m (×2) | $13 \times 10^{-5}$ | 0.10 m/m | $0.18 \times 10^{-5}$ |
| 8 | 3 | Oriented sheet of D | PBT sheet | Oriented sheet of D | — | — | D | Hot press | $-2.7 \times 10^{-5}$ | 0.13 m/m (×2) | $13 \times 10^{-5}$ | 0.10 m/m | $0.17 \times 10^{-5}$ |
| 9 | 3 | Oriented sheet of C | Epoxy* resin | Oriented sheet of C | — | — | C | Coating* | $-2.9 \times 10^{-5}$ | 0.15 m/m (×2) | $6.5 \times 10^{-5}$ | 0.12 m/m | $0.12 \times 10^{-5}$ |
| 10 | 3 | Oriented sheet of A | Epoxy* resin | Oriented sheet of A | — | — | A | Coating* | $-2.6 \times 10^{-5}$ | 0.15 m/m (×2) | $6.5 \times 10^{-5}$ | 0.12 m/m | $0.14 \times 10^{-5}$ |
| 11 | 3 | Oriented sheet of B | Epoxy* resin | Oriented sheet of B | — | — | B | Coating | $-2.7 \times 10^{-5}$ | 0.15 m/m (×2) | $6.5 \times 10^{-5}$ | 0.12 m/m | $0.14 \times 10^{-5}$ |
| 12 | 3 | Oriented sheet of D | Epoxy* resin | Oriented sheet of D | — | — | D | Coating | $-3.1 \times 10^{-5}$ | 0.15 m/m (×2) | $6.5 \times 10^{-5}$ | 0.12 m/m | $0.11 \times 10^{-5}$ |
| 13 | 3 | Oriented sheet of C | Copper sheet | Oriented sheet of C | — | — | C | Hot press | $-2.5 \times 10^{-5}$ | 0.13 m/m (×2) | $1.8 \times 10^{-5}$ | 0.40 m/m | $0.12 \times 10^{-5}$ |
| 14 | 3 | Oriented sheet of C | Tin sheet | Oriented sheet of C | — | — | C | Hot press | $-2.5 \times 10^{-5}$ | 0.13 m/m (×2) | $1.1 \times 10^{-5}$ | 0.80 m/m | $0.11 \times 10^{-5}$ |
| 15 | 3 | Oriented sheet of C | Aluminum sheet | Oriented sheet of C | — | — | C | Hot press | $-2.5 \times 10^{-5}$ | 0.13 m/m (×2) | $2.4 \times 10^{-5}$ | 0.40 m/m | $0.12 \times 10^{-5}$ |
| 16 | 3 | Aluminum sheet | Oriented sheet of C | Aluminum sheet | — | — | C | Hot press | $-2.5 \times 10^{-5}$ | 0.13 m/m (×2) | $2.4 \times 10^{-5}$ | 0.20 m/m | $0.12 \times 10^{-5}$ |
| 17 | 5 | Aluminum sheet | Oriented sheet of C | Aluminum sheet | Oriented sheet of C | Aluminum sheet | C | Hot press | $-2.5 \times 10^{-5}$ | 0.13 m/m (×2) | $2.4 \times 10^{-5}$ | 0.15 m/m | $0.11 \times 10^{-5}$ |
| 18 | 5 | Copper | Epoxy resin bond layer | Oriented sheet of C | Bonding layer | Copper | C | Coating | $-2.9 \times 10^{-5}$ | 0.15 m/m (×2) | $6.5 \times 10^{-5}$, $1.8 \times 10^{-5}$ | 0.05 m/m (×2) 0.10 m/m (×2) | $0.10 \times 10^{-5}$ |

*Epoxy resin: chief material "Epikote", curing agent "Tormide" (both trade names, Shell Co.). After coating, heat cured at 80° C. for 3 hrs, then allowed to cool.

The embodiments of the invention in which an exclusive privilege or property is claimed are defined as follows:

1. A method for manufacturing an article of superior dimensional stability comprising laminating:
   (a) at least one first layer of a molecularly oriented sheet formed by the melt-processing of a thermoplastic polymer which exhibits an anisotropic melt phase wherein said molecularly oriented sheet exhibits a negative linear thermal expansion coefficient in the direction of the polymer flow during its formation, and
   (b) at least one second layer which exhibits a positive linear thermal expansion coefficient,
wherein said first and second layers are regulated in thickness so that in the resulting article the respective negative and positive linear thermal expansion coefficients of (a) and (b) are substantially balanced thereby imparting stability to the overall laminate.

2. A method for manufacturing an article of superior dimensional stability according to claim 1 wherein said at least one first layer (a) of a molecularly oriented sheet of a thermoplastic polymer which exhibits an anisotropic melt phase is formed by melt-extrusion followed by drawing.

3. A method for manufacturing an article of superior dimensional stability according to claim 1 wherein said at least one second layer (b) is formed from a substantially non-oriented layer of a thermoplastic polymer which exhibits an anisotropic melt phase.

4. A method for manufacturing an article of superior dimensional stability according to claim 1 wherein said at least one second layer (b) is formed from a substantially non-oriented layer of a thermoplastic polymer which exhibits an isotropic melt phase.

5. A method for manufacturing an article of superior dimensional stability according to claim 1 wherein said at least one second layer (b) is a metallic sheet.

6. A method for manufacturing an article of superior dimensional stability according to claim 1 wherein said at least one second layer (b) is formed of a thermosetting resin.

7. A method for manufacturing an article of superior dimensional stability according to claim 1 wherein said article consists of an odd number of total layers which is at least three.

8. A method for manufacturing an article of superior dimensional stability according to claim 1 wherein the resulting article exhibits a linear thermal expansion coefficient on the order of $1 \times 10^{-6}$ cm./cm.°C.

9. A laminated article of superior dimensional stability comprising adjoining bonded layers comprising:
   (a) at least one first layer of a molecularly oriented sheet formed by the melt-processing of a thermoplastic polymer which exhibits an anisotropic melt phase wherein said molecularly oriented sheet exhibits a negative linear thermal expansion coefficient in the direction of the polymer flow during its formation, and
   (b) at least one second layer which exhibits a positive linear thermal expansion coefficient,
wherein said first and second layers are regulated in thickness so that the respective negative and positive linear thermal expansion coefficients of (a) and (b) are substantially balanced thereby imparting stability to the overall laminate.

10. A laminated article of superior dimensional stability according to claim 9 wherein said at least one first layer (a) of a molecularly oriented sheet of a thermoplastic polymer which exhibits an anisotropic melt phase is formed by melt-extrusion followed by drawing.

11. A laminated article of superior dimensional stability according to claim 9 wherein said at least one second layer (b) is formed from a substantially non-oriented layer of a thermoplastic polymer which exhibits an anisotropic melt phase.

12. A laminated article of superior dimensional stability according to claim 9 wherein said at least one second layer (b) is formed from a substantially non-oriented layer of a thermoplastic polymer which exhibits an isotropic melt phase.

13. A laminated article of superior dimensional stability according to claim 9 which exhibits a linear thermal expansion coefficient on the order of $1 \times 10^{-6}$ cm./cm.°C.

14. A laminated article of superior dimensional stability according to claim 9 wherein said at least one first layer (a) is formed from a melt-processable thermoplastic which is capable of forming an anisotropic melt phase which exhibits an inherent viscosity of at least about 2.0 dl./g. when dissolved in a concentration of 0.1 percent by weight in pentafluorophenol at 60° C.

15. A laminated article of superior dimensional stability according to claim 9 wherein said at least one first layer (a) is formed from a melt-processable thermoplastic which is capable of forming an anisotropic melt phase which exhibits an inherent viscosity of about 2.0 to 10.0 dl./g. when dissolved in a concentration of 0.1 percent by weight in pentafluorophenol at 60° C.

16. A laminated article of superior dimensional stability according to claim 9 wherein said at least one first layer (a) is formed from a melt-processable thermoplastic which is capable of forming an anisotropic melt phase which includes more than 10 mol of repeating units which contain a naphthalene moiety.

17. A laminated article of superior dimensional stability according to claim 16 wherein said naphthalene moiety of said melt-processable thermoplastic which is capable of forming an anisotropic melt phase is selected from the group consisting of 6-oxy-2-naphthoyl moiety, 2,6-dioxynaphthalene moiety, and 2,6-dicarboxynaphthalene moiety.

18. A laminated article of superior dimensional stability according to claim 9 wherein said at least one first layer (a) is formed from a melt-processable polyester which is capable of forming an anisotropic melt phase consisting essentially of the recurring moieties I and II which may include substitution of at least some of the hydrogen atoms present upon an aromatic ring wherein:

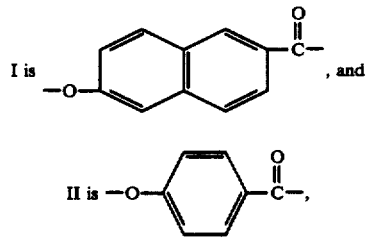

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mol percent of moiety I, and approximately 10 to 90 mol percent of moiety II.

19. A laminated article of superior dimensional stability according to claim 18 wherein moiety I is present in a concentration of about 30 mol percent and moiety II is present in a concentration of about 70 mol percent.

20. A laminated article of superior dimensional stability according to claim 9 wherein said at least one first layer (a) is formed from a melt-processable polyester which is capable of forming an anisotropic melt phase consisting essentially of recurring moieties I, II, and III which may include substitution of at least some of the hydrogen atoms present upon an aromatic ring wherein:

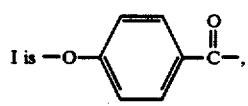

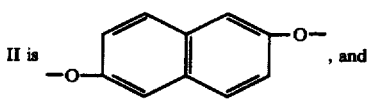

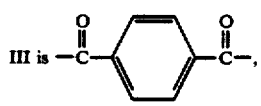

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 30 to 70 mol percent of moiety I.

21. A laminated article of superior dimensional stability accordng to claim 20 wherein moiety I is present in a concentration of about 40 to 60 mol percent, moiety II is present in a concentration of about 20 to 30 mol percent, and moiety III is present in a concentration of about 20 to 30 mol percent.

22. A laminated article of superior dimensional stability according to claim 9 wherein said at least one first layer (a) is formed from a melt-processable polyester which is capable of forming an anisotropic melt phase consisting essentially of the recurring moieties I, II, III and IV wherein:

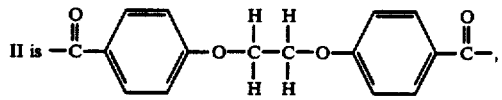

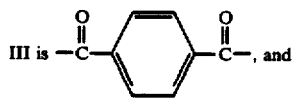

-continued

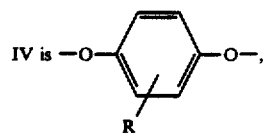

where R is methyl, chloro, bromo, and mixtures thereof, and is substituted for a hydrogen atom present upon the aromatic ring, and wherein the polyester comprises about 20 to 60 mol percent of moiety I, about 5 to 18 mol percent of moiety II, about 5 to 35 mol percent of moiety III, and about 20 to 40 mol percent of moiety IV.

23. A laminated article of superior dimensional stability according to claim 22 wherein moiety I is present in a concentration of about 35 to 45 mol percent, moiety II is present in a concentration of about 10 to 15 mol percent, moiety III is present in a concentration of about 15 to 25 mol percent, and moiety IV is present in a concentration of about 25 to 35 mol percent.

24. A laminated article of superior dimensional stability according to claim 9 wherein said at least one first layer (a) is formed from a melt-processable polyester which is capable of forming an anisotropic melt phase consisting essentially of moieties I, II, III and IV which may include substitution of at least some of the hydrogen atoms present upon an aromatic ring wherein:

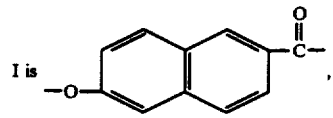

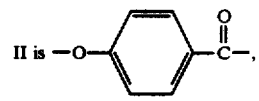

III is a dioxyaryl moiety of the formula —O—Ar—O— where Ar is a divalent radical comprising at least one aromatic ring, and IV is a dicarboxyaryl moiety of the formula

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 20 to 40 mol percent of moiety I, in excess of 10 mol percent but less than about 50 mol percent of moiety II, in excess of 5 mol percent but less than about 30 mol percent of moiety III, and in excess of 5 mol percent but less than 30 mol percent of moiety IV.

25. A laminated article of superior dimensional stability according to claim 24 wherein moiety I is present in a concentration of about 20 to 30 mol percent, moiety II is present in a concentration of about 25 to 40 mol percent, moiety III is present in a concentration of about 15 to 25 mol percent, and moiety IV is present in a concentration of about 15 to 25 mol percent.

26. A laminated article of superior dimensional stability according to claim 9 wherein said at least one first layer (a) is formed from a melt-processable polyester which is capable of forming an anisotropic melt phase consisting essentially of recurring moieties I, II, and III which may include substitution of at least some of the hydrogen atoms present upon an aromatic ring wherein:

I is 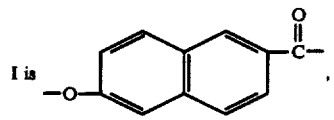,

II is a dioxyaryl moiety of the formula —O—Ar—O— where Ar is a divalent radical comprising at least one aromatic ring, and III is a dicarboxyaryl moiety of the formula

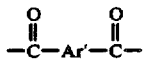

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 10 to 90 mol percent of moiety I, about 5 to 45 mol percent of moiety II, and about 5 to 45 mol percent of moiety III.

27. A laminated article of superior dimensional stability according to claim 26 wherein moiety I is present in a concentration of about 20 to 80 mol percent, moiety II is present in a concentration of about 10 to 40 mol percent, and moiety III is present in a concentration of about 10 to 40 mol percent.

28. A laminated article of superior dimensional stability according to claim 9 wherein said at least one first layer (a) is formed from a melt-processable poly(ester-amide) which is capable of forming an anisotropic melt phase consisting essentially of recurring moieties I, II, and III, and optionally IV, wherein:

I is 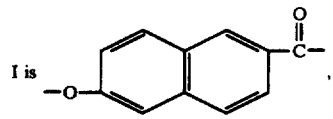,

II is

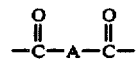

where A is a divalent radical comprising at least one aromatic ring or a divalent transcyclohexane radical, III is —Y—Ar—Z— where Ar is a divalent radical comprising at least one aromatic ring, Y is O, NH, or NR, and Z is NH or NR, where R is an alkyl group having 1 to 6 carbon atoms or an aryl group, and IV is —O—Ar'—O— where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said poly(ester-amide) comprises about 10 to 90 mol percent of moiety I, about 5 to 45 mol percent of moiety II, about 5 to 45 mol percent of moiety III, and about 0 to 40 mol percent of moiety IV.

29. A laminated article of superior dimensional stability according to claim 28 wherein moiety I is present in a concentration of about 70 mol percent, moiety II is

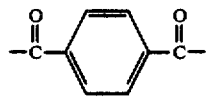

and is present in a concentration of about 15 mol percent, moiety III is

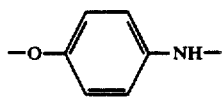

and is present in a concentration of about 15 mol percent, and moiety IV is substantially absent.

* * * * *

UNITED STATES PATENT OFFICE
CERTIFICATE OF CORRECTION

Patent No. 4,717,624         Dated January 5, 1988

Inventor(s) Y. Ikenaga et al

It is certified that error appears in the above-identified patent and that said Letters Patent are hereby corrected as shown below:

<u>IN THE HEADING</u>

Change the name of the Assignee from "Hoechst Celanese Corporation" to --Polyplastics Co., Ltd., Osaka, Japan --.

Signed and Sealed this

Twenty-first Day of June, 1988

Attest:

DONALD J. QUIGG

Attesting Officer

Commissioner of Patents and Trademarks